Patented Feb. 6, 1951

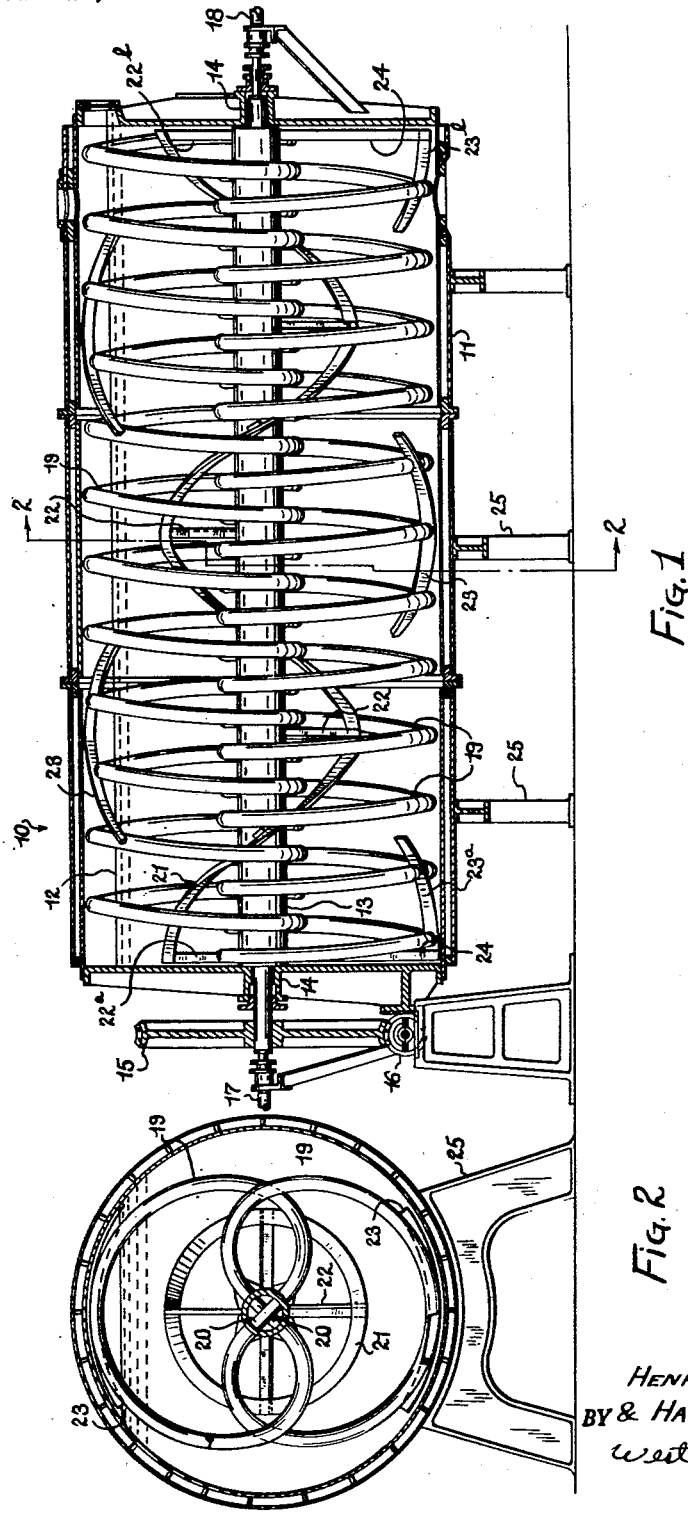

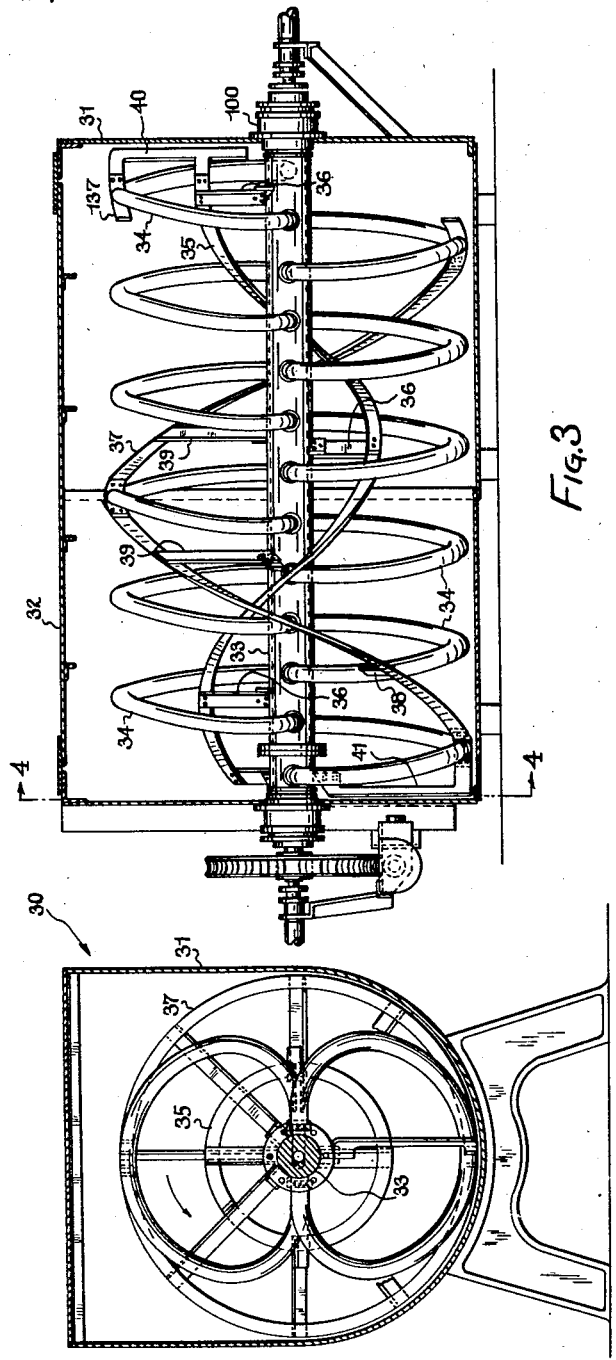

2,540,250

UNITED STATES PATENT OFFICE 2,540,250

SUGAR CRYSTALLIZER APPARATUS

Henry H. Feldstein, Cleveland, and Harry R. Kilby, East Cleveland, Ohio

Application January 21, 1949, Serial No. 71,986

10 Claims. (Cl. 127—15)

This invention relates to apparatus for use in the crystallization of sucrose or other sugars or other substances and to a method of crystallization of sugar.

In the crystallization of sucrose, for example, the sugar is dissolved in the mother liquor and the purified and concentrated material, called massecuite, is ordinarily quite viscous and is processed in large tanks to recover the dissolved sugar therein. Ordinarily the sugar is recovered by cooling the massecuite and obtaining a supersaturated solution from which the sugar crystals will separate. Due to the large volumes of material being processed and to the viscosity of same, it is difficult to maintain the processed material uniform and localized crystallization may occur without spreading uniformly throughout the material.

It will be realized that the apparatus of the invention is suited for use in the crystallization of any type of sugar such as beet, cane, dextrose, levulose, or cerulose by cooling a fluid mass of same.

The general object of the present invention is to provide a new and improved apparatus of the character described and to provide an apparatus which has an effective circulation of the heat exchanger medium therein and which also has a positively induced circulation of the material in which the movable portion of the apparatus is positioned.

Another object of the invention is to provide a sucrose crystallizer wherein crystals formed in one portion of the apparatus are effectively transferred to other regions of the apparatus thus improving the process of sugar recovery.

A further object of the invention is to provide apparatus of the class described wherein a movable shaft positions two diametrically opposed stirrer scrolls that are relatively widely spaced radially of their positioning shaft.

Another object of the invention is to provide a sucrose crystallizer which is efficient and rapid in processing the material positioned therein and which is of sturdy construction and made from a minimum of parts.

The foregoing and other objects and advantages of the invention will be made more apparent as the specification proceeds.

For a better understanding of the present construction, reference should be had to the accompanying drawings, wherein:

Fig. 1 is a longitudinal section, partly in elevation, of apparatus embodying the principles of the invention;

Fig. 2 is a vertical section taken on line 2—2 of Fig. 1; and

Figs. 3 and 4 are views similar to Figs. 1 and 2 of a modification of the apparatus of the invention.

The present invention, broadly speaking, resides in the provision of means for continuously and effectively cooling the crystallizing mass and for inducing super saturation continuously in the mother liquor to precipitate the sugar contained therein. These means include cooling coils which are carried by a positioning shaft with the ends of the coils being connected in series for flow of coolant therethrough, and two oppositely inclined stirrer scrolls that are secured to the shaft in substantially diametrically opposed relation for movement of the mother liquor throughout the confining chamber.

Attention now is directed to the accompanying drawings and corresponding numerals will be used in the specifications and drawings to identify corresponding parts. Fig. 1 of the drawings shows a crystallizer 10 which includes a substantially cylindrical containing tank 11 in which the liquid, usually massecuite, to be processed is positioned. The tank 11 is provided with suitable inlet and outlet openings for introducing liquid material 12 therein and removing it therefrom after being processed in a desired manner. The tank 11 has a shaft 13 positioned therein and extending the length thereof. This shaft 13 is journalled at each end in suitable bearing means 14 carried by the ends of the tank 11. Normally the shaft 13 is driven and to this end a gear 15 is secured to one end of the shaft 13 and engaged with a suitable drive device, in this instance a worm 16, which supplies driving power to the shaft 13. The shaft 13 has tubes 17 and 18 extending from the ends thereof and these tubes are provided for flow of a heat exchanger medium into and through the shaft 13 and coil means associated therewith.

In order to provide for heat transfer between the liquid 12 and heating or cooling mediums circulated through the tubes 17 and 18, a plurality of coils 19 are secured to the shaft 13 at their ends and extend therefrom radially an appreciable distance so that the perimeter of the coils 19 lies substantially adjacent the periphery of the tank 11. The coils 19 are so positioned on the shaft 13 that the inlet end of each coil connects to the outlet end of the preceding coil whereby they are arranged in series on the shaft 13 for flow of fluid therethrough. Of course, the inlet end of the first coil connects directly to one of the tubes 17 or 18 and the outlet end of the last coil 19 then connects to the remaining end of the tubes 17 or 18 whereby a continuous flow of heat transfer medium is provided by the coils 19. Usually separate lengths of pipe or tubing are positioned within the shaft 13 for connecting adjacent ends of the different coils 19.

Movement of the liquid 12 contained in the tank 11 axially of the tank is provided by means of a helical stirrer or scroll 21 that is positioned radially within the coils 19 and extends substantially the length of the tank 11. The scroll 21 usually is secured to the shaft 13 by means of positioning bars 22 and two bars $22^a$ and $22^b$ are shown extending radially outwardly of the shaft 13 at the ends thereof for securing the ends of the scrolls 21 in position. These bars $22^a$ and $22^b$ are positioned immediately adjacent the ends of the tank 11 and function as scraper bars for removing any crystals depositing on such portion of the tank 11.

A further important feature of the present invention is that additional stirrer means are provided adjacent the circumference of the tank 11 for aiding in movement of the liquid 12 throughout the tank 11. Thus a plurality of arcuate stirrer blades 23 are secured to the radially outer portions of the coils 19 in any conventional manner at diametrically opposed portions thereof, and are preferably inclined oppositely to the scrolls 21 for combining with such scrolls 21 to provide for flow of the liquid 12 along the shaft in one axial direction whereas the liquid is moved in the opposite axial direction adjacent the periphery of the tank. The stirrer blades 23 are positioned preferably at different axial positions of the shaft 13 and form, in effect, a substantially continuous helical stirrer scroll. Fig. 2 of the drawings best shows that the coils 19 are substantially semi-circular in shape and that half of the coils 19 extend from the shaft 13 in one given direction whereas the remaining coils 19 are diametrically opposed to the other coils so that two diametrically opposed sets of coils are formed in the crystallizer 10. Fig. 1 best shows that the stirrer blades 23 are overlapped axially in the tank 11 but with axially adjacent stirrer blades being carried by a different set of the two sets of coils formed in the crystallizer. The stirrer blades 23 also function as scrapers since their outer surfaces lie immediately adjacent the inner surface of the tank 11.

Adjacent the ends of the shaft 13, the end stirrer blades $23^a$ and $23^b$ are secured at the ends of the shaft 13 by means of support bars 24 which are carried by the shaft 13 and extend radially therefrom. These bars 24 also serve as scrapers for the ends of the tank 11 and remove crystals depositing thereon.

Figs. 1 and 2 show that the tank 11 normally is positioned upon suitable saddle forms 25 to elevate the tank from the surrounding support floor.

In the modification of the crystallizer shown in Figs. 3 and 4 a crystallizer 30 is shown. This crystallizer 30 includes a tank 31 which has a semi-cylindrical bottom portion and has a flat elongated upper portion provided therefor, which top usually has a cover 32 secured thereto. The tank 31 has a shaft 33 positioned therein and two sets of coils 34 are secured to the shaft 33 the same as the coils 19 are secured to the shaft 13 and are adapted to provide for the flow of heat exchanger fluid therethrough. In Fig. 3, the support saddles for the tank 31 have been partially omitted.

Two continuous arcuate stirrer means or scrolls are provided in this modification of the invention and are diametrically opposed but preferably oppositely inclined to create different directions of movement of the material contained in the tank 11 depending upon the radial distance of such material from the shaft 33. Thus a continuous inner scroll 35 is secured to the shaft 33 by support bars 36 and an outer scroll 37 is secured to some of the coils 34 directly and is also positioned by means of bars 38 each of which engages with one of the coils 34 and extends radially therefrom and by other support bars 39 that extend to the shaft 33.

At one end of the crystallizer 30 the outer scroll 37 is terminated in spaced relation to the end of the tank 31 and a completion portion 137 of the scroll 37 is shown secured to a support bar 40 which extends radially from the shaft 33 and also is secured to the end of the inner scroll 36. This bar 40 also functions as a scraper since it prevents the accumulation of crystals of other material upon the end of the tank 31. Likewise, a similar bar 41 is secured to the shaft 33 at the other end of the apparatus for positioning the opposite end of the scroll 37 in a desired manner and substantially balancing the apparatus. It will be noted that the coils 34 are of smaller circumferential extent than the coils 19 but that the sets of coils 34 are of substantially semi-circular shape.

When the shafts on which the heat transfer coils of the invention rotate, the material in the crystallizers normally will not be moved due to such coil rotation since normally the drive and mounting shafts only turn a few revolutions per minute and such slow movement of the curved contour of the heat transfer coil does not effect any displacement of the material being processed. Thus it has been found that positive stirrer devices must be used to effect movement of the material axially of the crystallizer.

It will be seen that the stirrer means used in the crystallizers of the invention are balanced with relation to the shaft positioning same and this facilitates movement and design of the shaft while it also contributes to the production of a desired uniform flow of material contained in the processing tank. Of course the processing tanks may be made of any desired length and may have duplication of all or portions of the apparatus disclosed herein, depending upon the desired length of the tank. Usually the two radially spaced scrolls produce movement of the material in the crystallizer in opposite directions but these directions may be varied, if desired.

Fig. 3 of the drawings shows that the scraper bar 40 is terminated at spaced radial relationship to the shaft 33. This permits bearing means 100 to extend axially into the tank 31 a short distance for positioning the shaft therein, if desired. Thus the scraper bar 40 is carried by the end coil 34 thereadjacent while it is also partially positioned by the end support posts 36 to which the scraper bar 40 also is secured. Similarly, the scraper bar 41 may have an offset radially inner end portion to permit substantially the same construction adjacent the other end of the shaft 33.

It will be seen that the arcuate radially outer stirrer means used in the apparatus of the invention is of a diameter equal to the combined effective radii of each of the sets of coils formed by the heat transfer coils of the apparatus. That is, the heat transfer coils in both embodiments of the invention are arranged in two diametrically opposed but axially aligned sets. The drawings show that the individual coils of the set may be referred to as substantially semi-circular although actually the individual coils are of a different shape from a true semi-circular contour. By such positioning of the heat transfer coils, the stirrer scroll which extends continuously, or substantially continuously in an axial direction of the crystallizer will be, in effect, radially within the coils for the inner stirrer scroll, whereas the outer stirrer scroll will be radially beyond certain of the individual heat transfer coils whereas such outer stirrer scroll in other instances may be secured to the radially outermost portion of other heat transfer coils.

The stirrer scrolls of the invention produce a positive movement of different portions of the liquid being treated in radially spaced sections of the apparatus. Actually the movement zones would comprise more or less concentric tubular sections of the apparatus so that by effecting movement of the fluid in these two radially spaced tubular sections of the apparatus, the remaining volume of the material being processed would tend to flow into the active movement zones and thus create a desired flow of material throughout the entire apparatus. The material being processed, usually being quite viscous, then could be effectively circulated throughout the entire volume of the apparatus whereby localized crystallization is prevented and whereby no zone of the material being processed would be at an appreciably different temperature from the remainder of the material being processed.

By combining the use of a continuous cooling coil with the two stirrer scrolls for effecting movement of the material throughout the crystallizer, the present apparatus provides an effective and efficient means of crystallizing sugar from its mother liquor since sugar crystals are transferred from one region of the liquor to another and the temperature of the liquid is maintained substantially uniform. Furthermore, once the apparatus is set up, it can be operated for long periods of time with little or no maintenance thereon and will function efficiently so that the objects of the invention are achieved.

While two complete embodiments of the invention have been disclosed herein, it will be appreciated that modification of these particular embodiments of the invention may be resorted to without departing from the scope of the invention as defined by the appended claims.

Having thus described our invention, what we claim is:

1. A crystallizer comprising a shaft, a plurality of heat transfer coils carried in series on and completely supported at their ends by said shaft, the delivery end of one coil being connected through said shaft to the receiving end of the next coil, and said coils extending radially from said shaft an appreciable distance, means for introducing a heat transfer medium to the starting end of the first coil and for withdrawing it from the discharge end of the last coil, a continuous helical stirrer scroll positioned radially within said coils and axially inclined towards one end of said shaft, said stirrer scroll extending the length of said shaft, arcuate stirrer means positioned radially outwardly of at least some of said coils and axially inclined towards the other end of said shaft, said stirrer means being of substantially the length of said shaft, a scraper bar positioned at both ends of said shaft and extending radially therefrom, and a short arcuate stirrer secured to each of said scraper bars, said stirrer means being substantially diametrically opposed to said stirrer scroll at all portions thereof.

2. A crystallizer comprising a shaft, a plurality of heat transfer coils carried in series on and completely supported at their ends by and extending radially from said shaft, the delivery end of one coil being connected through said shaft to the receiving end of the next coil, means for introducing a heat transfer medium to the starting end of the first coil and for withdrawing it from the discharge end of the last coil, a continuous helical stirrer scroll positioned radially within said coils and axially inclined towards one end of said shaft, said stirrer scroll extending substantially the length of said shaft, arcuate stirrer means positioned radially outwardly of certain of said coils and at the radially outer portion of other coils and axially inclined towards the other end of said shaft, and a scraper bar secured to each end of said shaft and extending radially therefrom in substantially diametrically opposed relation to each other, said stirrer means being substantially diametrically opposed to said stirrer scroll at all portions thereof.

3. A crystallizer comprising a shaft, a plurality of heat transfer coils carried in series on and completely supported at their ends by and extending radially from said shaft, the delivery end of one coil being connected through said shaft to the receiving end of the next coil, means for passing a heat transfer medium through the coils, a continuous helical stirrer blade positioned radially within said coils and axially inclined towards one end of said shaft, said stirrer blade extending substantially the length of said shaft, arcuate stirrer means positioned radially outwardly of at least part of said coils and axially inclined towards the other end of said shaft, said arcuate stirrer means being diametrically opposed to said stirrer blade, and a scraper bar positioned at each end of said shaft and extending radially of the crystallizer, said scraper bars being carried at least partially by the end coils.

4. A crystallizer comprising a shaft, a plurality of heat transfer coils secured at their ends to and extending radially from said shaft and being adapted to transmit a heat transfer medium therethrough, a helical stirrer scroll secured radially within the said coils and extending the length of said shaft, and a second helical stirrer scroll diametrically opposed to said first stirrer and positioned radially outwardly of the first stirrer, said second stirrer scroll being secured to said coils at the radially outermost portions of same, said stirrer scrolls being inclined in opposite axial directions to facilitate uniform flow of material through the member in which the crystallizer is rotated.

5. A crystallizer comprising a shaft, a plurality of heat transfer coils secured at their ends to said shaft and being adapted to transmit a heat transfer medium therethrough, said coils extending transversely of the axis of said shaft, a helical stirrer scroll secured radially within the said coils and extending the length of said shaft, and a second helical stirrer scroll diametrically opposed to said first stirrer and positioned radially outwardly of the first stirrer.

6. A crystallizer comprising a shaft, a plurality of heat transfer coils secured at their ends to said shaft and being adapted to transmit a heat transfer medium therethrough, said coils extending transversely of the axis of said shaft, a helical stirrer secured radially within the said coils and extending the length of said shaft, and a plurality of arcuate stirrer blades substantially diametrically opposed to corresponding portions of said first stirrer and positioned radially outwardly of said first stirrer.

7. A crystallizer comprising a shaft, a plurality of heat transfer coils secured to said shaft and being adapted to transmit a heat transfer medium therethrough, said coils extending transversely of the axis of said shaft, a helical stirrer secured radially within the said coils and extending the length of said shaft, and helical stirrer means substantially diametrically opposed to said first stirrer at all portions thereof and positioned radially outwardly of said first stirrer.

8. A crystallizer as in claim 1 wherein said heat transfer coils are arranged in two axially aligned diametrically opposed sets of substantially semi-circular members, and said arcuate stirrer means comprise short members that are circumferentially spaced and are partially axially overlapped with the next adjacent stirrer means.

9. A crystallizer as in claim 1 wherein said heat transfer coils are arranged in two axially aligned diametrically opposed sets of substantially semi-circular members, and said arcuate stirrer means comprise a helical member of a diameter equal to the sum of the effective radii of a member from each of the sets of coils.

10. A crystallizer comprising a shaft, a plurality of heat transfer coils secured to said shaft and being adapted to transmit a heat transfer medium therethrough, said coils extending transversely of the axis of said shaft, a helical stirrer secured radially within the said coils and extending the length of said shaft, and arcuate stirrer means substantially diametrically opposed to said first stirrer at all portions thereof and positioned radially outwardly of said first stirrer at the radially outermost portions of at least some of said coils.

HENRY H. FELDSTEIN.
HARRY R. KILBY.

REFERENCES CITED

The following references are of record in the file of this patent:

UNITED STATES PATENTS

| Number | Name | Date |
|---|---|---|
| 539,055 | Holthaus | May 15, 1895 |
| 736,875 | Ragot et al. | Aug. 18, 1903 |
| 2,097,208 | Grill | Oct. 26, 1937 |
| 2,153,082 | Grill | Apr. 4, 1939 |
| 2,186,234 | Boyd | Jan. 9, 1940 |
| 2,227,897 | Grill | Jan. 7, 1941 |
| 2,263,704 | Platte et al. | Nov. 25, 1941 |
| 2,379,895 | Feldstein | July 10, 1945 |